April 26, 1932  A. J. KILMER  1,855,971
METAL CUTTING TOOL
Filed April 11, 1928
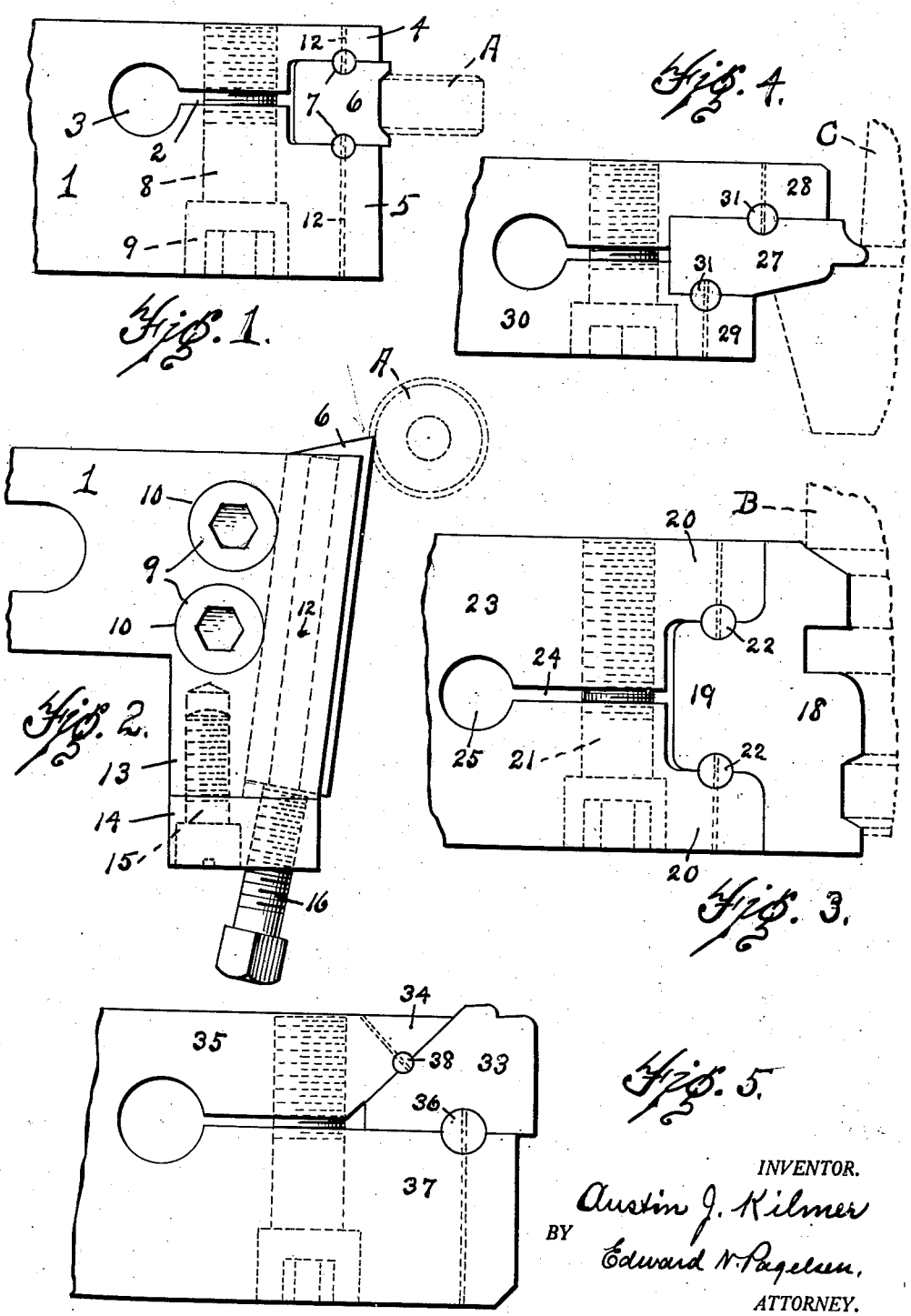
INVENTOR.
Austin J. Kilmer
BY Edward N. Pagelsen,
ATTORNEY.

Patented Apr. 26, 1932

1,855,971

UNITED STATES PATENT OFFICE

AUSTIN J. KILMER, OF ROSEVILLE, MICHIGAN

METAL CUTTING TOOL

Application filed April 11, 1928. Serial No. 269,084.

This invention relates to the construction of machine tools for cutting metal, particularly to that class wherein a comparatively small cutter of expensive "high-speed" alloy is secured in a shank or holder of less expensive steel, and its object is to provide cutters of this character and holders therefor which are so formed that the cutters will not readily break under the great stresses to which they are subjected.

This invention consists in a shank or holder having a bifurcated end whose parts constitute clamping jaws which are spaced apart to receive a cutter which fits between the two parts of the bifurcated end of the holder, the contacting faces of the cutter and the jaws of the holder being formed with cylindrical grooves to receive cylindrical keys, and means to press the jaws of the holder against the cutter.

It further consists in so forming the cutter that all grooves therein shall have rounded walls.

It also consists of the details of construction illustrated in the accompanying drawings and particularly pointed out in the claims.

In the drawings:

Figure 1 is a plan of one embodiment of my invention; and

Figure 2 is a side elevation thereof;

Figures 3, 4 and 5 are plans of modified forms of my invention.

Similar reference characters refer to like parts throughout the several views.

Bifurcated shanks or holders for cutters have been constructed with triangular ribs on the opposed faces of the two jaws of the bifurcated ends to constitute dove-tail sockets for the cutters.

Cutters fitting within these sockets are formed with grooves to receive the ribs on the jaws. This results in a serious reduction in the areas of the cutters at practically the ends of the holders, and as the ribs on the jaws of the holders have sharp edges and the grooves in the cutters are similarly formed, the cutters break at these reduced areas because of this dove-tail construction.

I have found that the strength of the cutters may be greatly increased by avoiding the use of triangular or other sharp-cornered grooves. I have also found that cylindrical keys to position the cutters and cylindrical grooves in the contacting faces of the jaws of the holders and cutters are of maximum efficiency for the present purpose.

In Figures 1 and 2, the holder 1 has a longitudinal slit 2 ending in a cylindrical hole 3, the slit and hole permitting sufficient movement of the jaws 4 and 5 which are recessed to receive the cutter 6 and grooved to receive the cylindrical keys 7. The cutter is also grooved to receive these keys.

Strong screws 8 have heads 9 seated in counter-bores 10 in the end 5 and these screws are threaded in the end 4. When these screws are tightened, these jaws 4 and 5 will grip the cutter sufficiently to hold it in working position and also keep the keys 7 in place. The pins 12 hold these keys in position when the cutter is removed so that these keys constitute semi-cylindrical ribs on the jaws. The grooves in the cutter are parallel to each other.

For extremely heavy work, the holder may be formed with an extension 13 to which a block 14 is attached by means of a strong screw 15. This block carries a setscrew 16 which engages the cutter 6 and assists in holding it in proper position.

The cutter shown in Figures 1 and 2 are adapted for turning rolls A, shown in dotted lines, but where a wide cutter 18 for turning work B is required, such a cutter may be formed with an extension 19 that may be clamped between the jaws 20 by means of screws 21. The keys 22 are again placed opposite each other, midway of the engaging faces, and the holder 23 is again formed with a slit 24 and hole 25. It will be observed that the corners, where the extension 19 joins the main body of the cutter, are rounded to avoid the forming of temper cracks and that the least area of the extension is at the keys 22 where the surfaces are rounded and again little subject to temper cracks.

The cutter 27 shown in Figure 4 is in engagement with a long jaw 28 and a short jaw 29 of the holder 30, and the keys 31 are positioned at about the middle lines of the engaging surfaces. This is of great advantage where side-cutting tools are supported to engage with C as indicated by dotted lines.

The cutter 33 shown in Figure 5 is adapted for very heavy work and projects beyond one side of the jaw 34 of the holder 35. The key 36 mounted in the heavy jaw 37 may be made heavier than the key 38. This view indicates the wide range of modifications of which the holders and cutters embodying my invention are susceptible.

I claim:—

1. A tool assembly for a lathe comprising a holder, the holder comprising a transversely slotted end portion providing resilient gripping jaws, transverse bolts for drawing the jaws together, a tool disposed longitudinally in the groove between the jaws and having a cutting edge at one end thereof in a plane transverse of the axis of the tool, semi-circular mating keyways formed in each jaw and the adjacent face of the tool longitudinally of the tool and key pins of circular cross section fitting in the keyways.

2. A lathe tool assembly comprising a holder having an end transversely grooved and slotted to provide resilient gripping jaws, keyways of rounded cross section formed in the opposing faces of the jaws longitudinally of the groove, means for forcing the jaws toward each other, a tool bit of high speed alloy clamped between the jaws transversely of the holder, said bit comprising a portion adapted to be gripped between the jaws and having keyways formed in opposite sides thereof adjacent to the gripping jaws and mating with the keyways in the jaws, the bottoms of all of the keyways being so rounded as to obviate the formation of temper flaws in the region where the width of the portion to be gripped is reduced by the grooves and a cutting edge formed upon an end of the bit and lying in a plane intersecting the axis of the grooves in the tool, and a key of rounded transverse section disposed in each cooperating pair of grooves to prevent movement of the bit in any direction other than that parallel to the grooves.

3. A lathe tool assembly comprising a holder having an end transversely slotted to provide resilient gripping jaws having keyways of rounded cross section disposed longitudinally in opposite faces thereof for a tool bit, a tool bit disposed between the jaws, transversely of the holder, the bit being composed of high speed alloy and having keyways of rounded cross section formed longitudinally in opposite sides thereof and mating with the rounded keyways in the faces of the jaws, keys disposed within the grooves, a cutting edge formed along the side of one end of the tool, one of said gripping jaws being extended forwardly beyond the other to provide a backing for the cutting edge, the end of the bit embodying the cutting edge lying in a plane transverse to the grooves.

4. In combination, a lathe tool holder having a groove of outwardly flaring V-shaped cross section formed therein to provide gripping jaws having keyways of semi-circular cross section formed longitudinally in operating faces thereof, a tool composed of high speed alloy disposed between the jaws transversely of the holder, a cutting edge formed at one end of the tool in a plane transverse the axis of the tool and groove, keyways formed in the sides of the tool longitudinally thereof, adjacent to the jaws, said grooves being of semi-circular cross section and mating with the semi-circular keyways within the jaw, and a cylindrical key disposed in each co-operating pair of grooves.

5. In combination, a lathe tool holder having a transverse slot at one end thereof to provide a pair of gripping jaws having keyways of semi-circular cross section formed longitudinally into opposing faces thereof, the outer edges of the slot being rounded, a tool bit of high speed alloy comprising a relatively wide body and a narrow shank fitting between the gripping jaws, transversely of the holder the junction between the body and the shank being curved to correspond to the rounded edges of the jaws, a cutting edge at one end of the bit in a plane transverse of the axis of the tool and longitudinal keyways of semi-circular cross section formed in the opposite sides of the shank and mating with the keyways in the jaws and cylindrical pins in the grooves.

AUSTIN J. KILMER.

CERTIFICATE OF CORRECTION.

Patent No. 1,855,971.                                              April 26, 1932.

AUSTIN J. KILMER.

It is hereby certified that error appears in the printed specification of the above numbered patent requiring correction as follows: Page 2, lines 73 and 74, claim 4, for the word "operating" read opposing; and that the said Letters Patent should be read with this correction therein that the same may conform to the record of the case in the Patent Office.

Signed and sealed this 5th day of July, A. D. 1932.

(Seal)
M. J. Moore,
Acting Commissioner of Patents.